United States Patent [19]

Spencer et al.

[11] Patent Number: 5,656,159

[45] Date of Patent: Aug. 12, 1997

[54] FILTER CARTRIDGE WITH INTEGRAL BACTERICIDE

[75] Inventors: Terrel F. Spencer; W. Sean Gallagher, both of Lake Geneva, Wis.

[73] Assignee: Sta-Rite Industries, Inc., Delavan, Wis.

[21] Appl. No.: 631,418

[22] Filed: Apr. 12, 1996

[51] Int. Cl.$^6$ .................................................. C02F 1/50
[52] U.S. Cl. .......................... 210/206; 210/209; 210/501
[58] Field of Search ................................ 210/206, 209, 210/501, 266

[56] References Cited

U.S. PATENT DOCUMENTS

| | | | |
|---|---|---|---|
| 2,008,131 | 7/1935 | Dieck et al. | 99/1 |
| 2,566,371 | 9/1951 | Quinn | 210/266 |
| 3,289,847 | 12/1966 | Rothemund | 210/282 |
| 3,357,563 | 12/1967 | Sicard | 210/209 |
| 3,749,244 | 7/1973 | Jannuzzi, Jr. | 210/206 |
| 3,780,867 | 12/1973 | Zirlis | 210/266 |
| 3,887,468 | 6/1975 | Bray | 210/206 |
| 4,092,245 | 5/1978 | Franks et al. | 210/64 |
| 4,188,295 | 2/1980 | Burnett | 210/206 |
| 4,196,081 | 4/1980 | Pavia | 210/284 |
| 4,396,512 | 8/1983 | Beaumann et al. | 210/668 |
| 4,540,489 | 9/1985 | Barnard | 210/501 |
| 4,610,783 | 9/1986 | Hudson | 210/169 |
| 4,714,546 | 12/1987 | Solomon et al. | 210/266 |
| 4,780,197 | 10/1988 | Schuman | 210/206 |
| 4,828,698 | 5/1989 | Jewell et al. | 210/266 |
| 4,883,587 | 11/1989 | LeVeen et al. | 210/94 |
| 4,921,600 | 5/1990 | Meissner | 210/169 |
| 5,011,602 | 4/1991 | Totani et al. | 210/484 |
| 5,128,100 | 7/1992 | Hollis et al. | 422/14 |
| 5,164,096 | 11/1992 | Nunn | 210/754 |
| 5,190,651 | 3/1993 | Spencer et al. | 210/305 |
| 5,279,748 | 1/1994 | Hackett | 210/757 |
| 5,328,609 | 7/1994 | Magnusson et al. | 210/266 |
| 5,364,528 | 11/1994 | Schwarz et al. | 210/323.2 |
| 5,433,867 | 7/1995 | Kisner | 210/754 |
| 5,478,467 | 12/1995 | LeMire et al. | 210/206 |

*Primary Examiner*—Cynthia L. Nessler
*Attorney, Agent, or Firm*—Jansson & Shupe, Ltd.

[57] ABSTRACT

A filter cartridge has an inner filter element and an outer filter element concentric therewith. The filter elements define a water flow space between them and a container of sanitizing granules is positioned in the space. The granules kill waterborne bacteria that come into contact therewith. In a more specific embodiment, the container is in a riser tube positioned in the water flow space. In another embodiment, the cartridge includes two riser tubes, each holding a container of sanitizing granules. In the alternative, one riser tube holds a container of an oxidizer such as chlorine or bromine pellets.

14 Claims, 5 Drawing Sheets

FILTER CARTRIDGE WITH INTEGRAL BACTERICIDE

FIELD OF THE INVENTION

This invention relates generally to liquid purification and separation and, more particularly, to apparatus for filtering and otherwise purifying liquid.

BACKGROUND OF THE INVENTION

Liquids, e.g., water, oil and the like, are often "conditioned" by passing them through filter cartridges to remove particulate matter. It may be said that such particulate matter is removed "mechanically" by impeding particulate movement as the liquid being filtered flows through the cartridge. Such cartridges are typically confined within a housing through which the liquid flows for filtering. Some installations use multiple filter cartridges within a single housing. Examples of a filter cartridge and housing are disclosed in U.S. Pat. Nos. 3,988,244 (Brooks), 4,507,200 (Meissner) and 5,190,651 (Spencer et al.).

Another type of arrangement used to purify water in a different way, i.e., by killing bacteria in such water, involves flowing water across a catalyst. Bacteria in the water are killed upon coming into contact with such catalyst. Aspects of this technology are described in "Research Note: $O_3$ or $O_2$ and Ag: A New Catalyst Technology for Aqueous Phase Sanitation" published in Ozone Science & Engineering, Vol. 15, pp. 533–546, and "A Story About O" published in Pool & Spa News, May 17, 1993. The latter depicts water flowing through a container housing a catalyst.

Patent literature is also of interest. U.S. Pat. No. 4,092,245 (Franks, deceased et al.) describes a water purification system with a filter shell housing a group of filter elements. After water is pre-filtered in the shell, it is directed to a separate shell housing a catalytic filter. Such filter has a number of horizontal perforate filter plates covered with high-friction filter cloth overlayed with a fine-powder biocatalyst layer. Because such layer can migrate through the horizontal plates, the patent explains that it is a good idea to apply a base coat of diatomaceous earth (DE) to the filter cloth.

U.S. Pat. No. 5,279,748 (Hackett) discloses a pool filter providing what the patent calls "electrolytic action" using particles of dissimilar metals. Copper and zinc are mentioned.

The filter has a container, the bottom of which supports a lower layer of gravel. The loose electrolytic medium rests atop the gravel. The piping is configured in such a way that water flows "top down" through the electrolytic medium and then radially through vented laterals in each of three outlet tubes. One of the stated features of the Hackett filter is that it removes chlorine and eliminates the need for chlorine.

While these prior art arrangements seem generally suited for their intended purposes, they are not without disadvantages. For example, the arrangement described in the Pool & Spa News article contemplates either using the catalyst without a particulate filter or using such catalyst with a separate (and separately-plumbed) filter cartridge and housing. In view of the invention, the need to operate without a filter cartridge (thereby permitting most particulates to remain in the water) and the complexity and added cost attending use of a separate catalyst holder are both unnecessary.

The arrangement disclosed in the Franks et al. patent uses separate housings for the small-mesh filter elements and for the catalyst. Using the latter requires (or at least recommends) applying a base coat of DE to the filter cloth. While the invention may be used with DE, persons familiar with the filter arts involving DE are well aware of how difficult it is to apply an evenly-thick coating thereof to filter cloth.

The arrangement disclosed in the Hackett patent contemplates some type of mechanical filter but seemingly fails to appreciate certain details of water purification. It is stated that the metal particles provide "controlled releases of oxides" into the water to kill bacteria. And the electrolytic granules change bacteria-killing chlorine (which is an oxidizer) into oxides and salts. Thus, it appears that the Hackett filter kills bacteria in generally the same way that chlorine in water kills bacteria, i.e., by dispersing a chemical in the water. To put it another way, there seems to be no "kill-on-contact" action at the site of the electrolytic granules, notwithstanding that the patent mentions a "catalytic action."

And in both the Hackett and Franks et al. arrangements, the electrolytic granules and catalyst, respectively, are loose in the container. There is no way to conveniently replace such granules and catalyst.

None of the prior art arrangements mentioned above use a granular oxidizer, e.g., chlorine or bromine. In the absence of a granular oxidizer, there is seemingly no need to recognize that pleated, thin-strand polypropylene mesh (a common material for making pleated filter media) is attacked by concentrated oxidizers.

An improved filter cartridge overcoming some of the problems and shortcomings of earlier work in this field would be an important advance in the art.

OBJECTS OF THE INVENTION

It is an object of the invention to provide an improved filter cartridge overcoming some of the problems and shortcomings of prior art filter cartridges.

Another object of the invention is to provide a filter cartridge combining the features of mechanical particulate filtering and catalytic "kill-on-contact" action.

Another object of the invention is to provide a filter cartridge combining, in another embodiment, the features of mechanical particulate filtering, catalytic "kill-on-contact" action and bacteria-killing using an oxidizer.

Yet another object of the invention is to provide a filter cartridge which, in one embodiment, uses a granular or pellet oxidizer.

Another object of the invention is to provide a filter cartridge in which the catalyst is easy to replace.

Still another object of the invention is to provide a filter cartridge which in one embodiment has both a catalyst and an oxidizer, both easy to replace.

Another object of the invention is to provide a filter cartridge which provides catalytic bacteria-killing action but in which the use of diatomaceous earth is not required.

Another object of the invention is to provide a filter cartridge which, in an embodiment using an oxidizer, isolates oxidizer-rich water from the pleated filter elements. How these and other objects are accomplished will become apparent from the following descriptions and from the drawings.

SUMMARY OF THE INVENTION

The invention involves a filter cartridge of the type having generally-cylindrical inner and outer filter elements concentric with one another and with a cartridge axis. Such elements define a water flow space between them and there is a container of sanitizing granules in the space. Waterborne bacteria contacting the granules are killed.

In a more specific embodiment, the granule container includes a inner flaccid bag confining the granules and a perforated, substantially rigid support member around the bag. An exemplary support member is a latticed cylinder structure, i.e., a structure having a number of openings therethrough so that water may pass through the support member and contact the granules in the bag.

In another aspect of the invention, the cartridge has a riser tube extending along the water flow space. Such tube extends along a tube axis which is generally parallel to the cartridge axis. The bag support member is in the tube and, most preferably, the support member and the tube are sized and conformably shaped so that the container may be slide-fitted into the tube. There is a retention device, e.g., a "notch-and-tab" arrangement, for positionally securing the support member in the tube.

More specifically, the tube is elongate and includes an inlet opening, an outlet port and a substantially imperforate wall extending between the opening and the port. The support member is between the inlet opening and the outlet port.

In another embodiment, the cartridge has generally-parallel first and second riser tubes in the flow space. Like the first tube, the second tube is elongate and includes an inlet opening, an outlet port and a substantially imperforate wall extending between the opening and the port. The granule container is in the first riser tube and the second riser tube holds either another container of sanitizing granules or holds an oxidizer such as chlorine or bromine pellets. The granules or pellets are positioned between the tube inlet opening and its outlet port.

The former arrangement, having two riser tubes extending along a tube length and holding granules, provides parallel flow paths through granules and is therefore effective to reduce pressure drop through the granules while yet assuring that some minimum quantity of water comes into contact with such granules. And pressure drop may be yet further reduced by providing the granules in containers having a container length significantly less than the tube length.

In the arrangement involving both sanitizing granules and an oxidizer, the cartridge is an integrated water treatment "package" for removing impurities in three different ways. That is, such cartridge includes small-micron filter elements for mechanically removing particulates, sanitizing granules for killing bacteria on contact and an oxidizer which migrates into the flowing water for further bacteria kill.

A common material for making the filter elements is or includes pleated, thin-strand polypropylene mesh which is known to be attacked by a concentrated oxidizer. In the arrangement involving a riser tube holding an oxidizer, "oxidizer-rich" water is around and in contact with such oxidizer, especially when the water pump is off and water is quiescent in the cartridge. In a preferred embodiment, a check valve is interposed between the oxidizer and the inlet opening to prevent the oxidizer-rich water from backflowing or migrating through the inlet opening and attacking the filter elements. But for the check valve, such migration may occur during quiescent conditions.

And in a highly preferred embodiment, there is a second check valve interposed between the oxidizer and the outlet port. In a quiescent system, both check valves are closed, effectively isolating the oxidizer (and the oxidizer-rich water) inside the riser tube and away from the mesh filter elements. (Polypropylene, injection-molding-grade, is also used to make the riser tubes and this grade of polypropylene seems more resistant to oxidizers. But in any event, such riser tubes are thick-walled and while subject to some "chalking" due to the presence of quiescent oxidizer-rich water therein, they are not likely to be eaten away by such water.)

In a specific embodiment involving two riser tubes containing sanitizing granules and/or an oxidizer, it is preferred that the outlet ports of such riser tubes both exhaust to and through the cartridge housing via a common discharge port. Accordingly, the cartridge includes a duct in flow communication with the riser tube outlet ports. Such duct may be embodied as a rigid or flexible pipe plumbed between such outlet ports or it may be a duct molded as part of the filter element support structure.

Other aspects of the invention are set forth in the following detailed description and in the drawings.

DETAILED DESCRIPTION OF PREFERRED EMBODIMENTS

Figure 1:
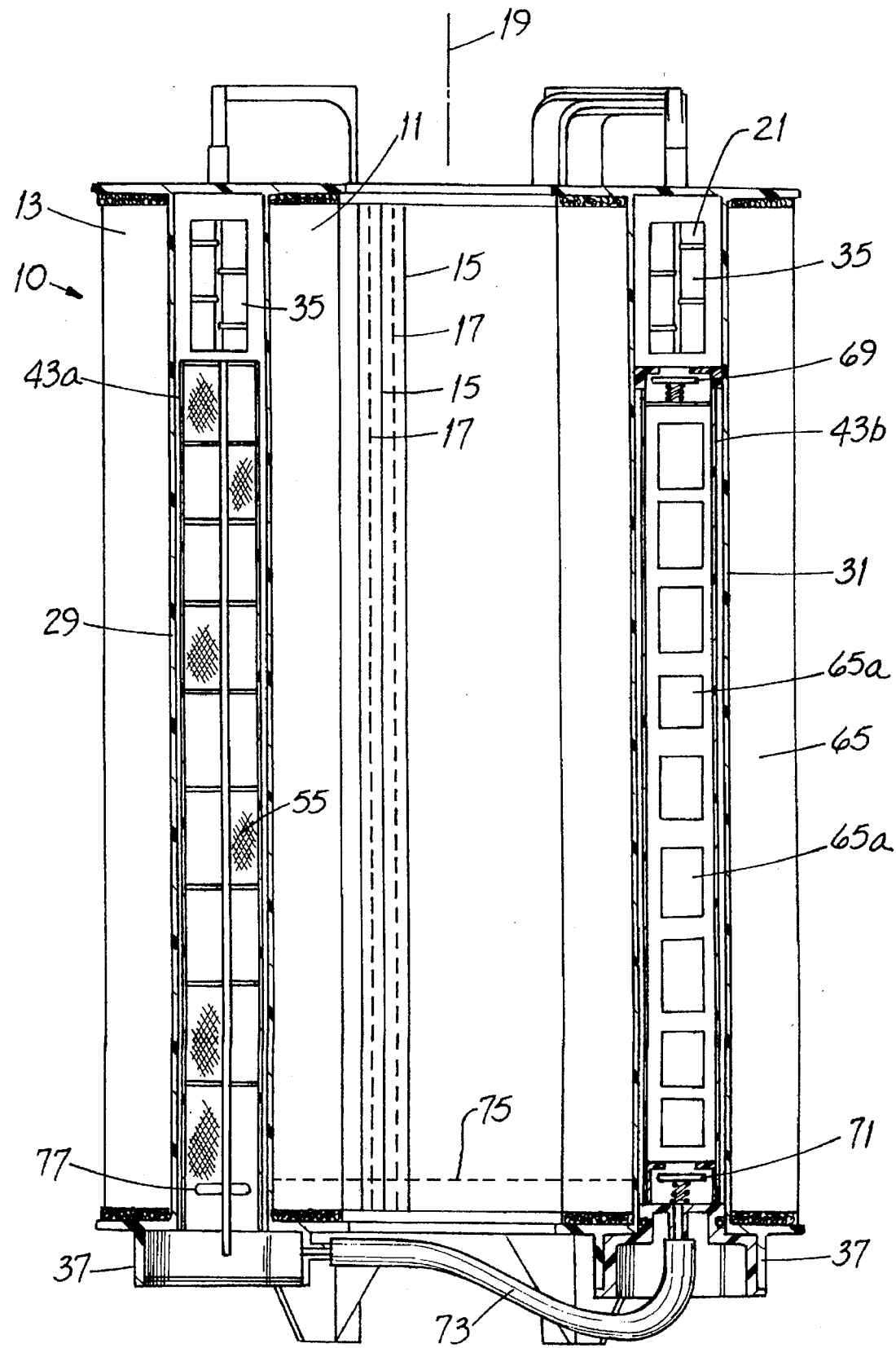
FIG. 1 is a sectional elevation view of one embodiment of the new filter cartridge.
Figure 3:
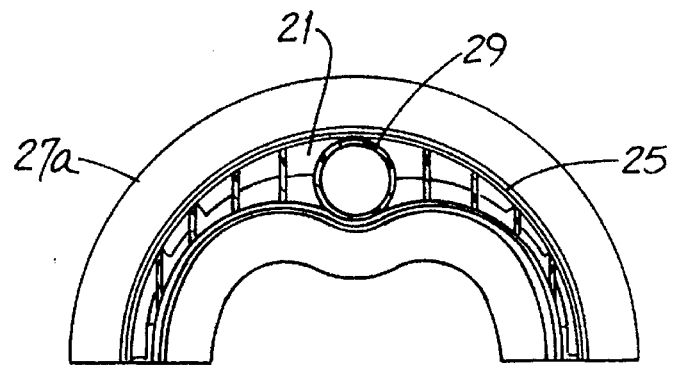
FIG. 3 is a sectional view of the half-core of FIG. 2 taken along the viewing plane 3—3 thereof.
Figure 2:
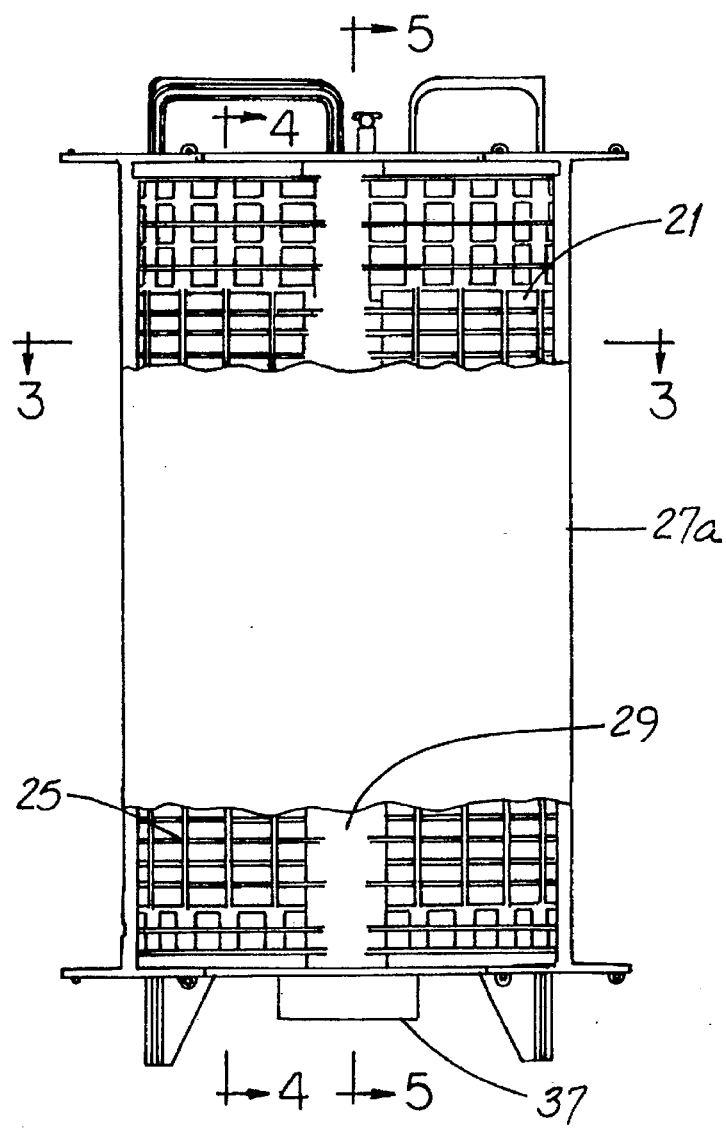
FIG. 2 is an elevation view of one of two substantially identical half-cores used to make the latticed core of the cartridge of FIG. 1. Parts are broken away.
Figure 4:
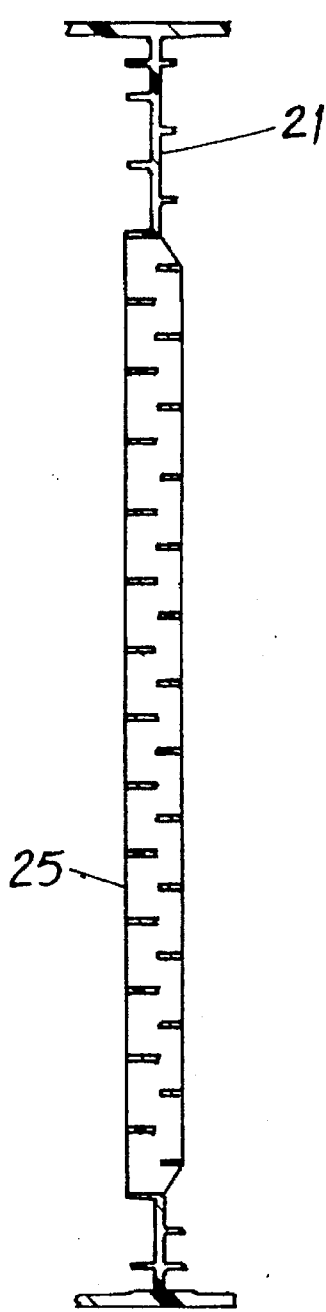
FIG. 4 is a sectional view of the half-core of FIG. 2 taken along the viewing plane 4—4 thereof.
Figure 5:
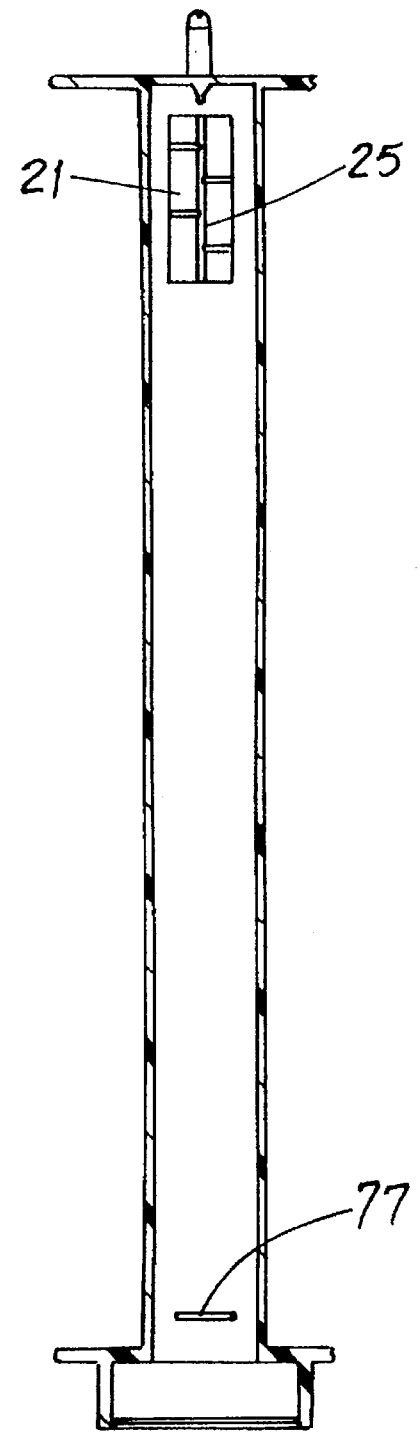
FIG. 5 is a sectional view of the half-core of FIG. 2 taken along the viewing plane 5—5 thereof.

Referring first to FIGS. 1 through 7, the new filter cartridge 10, particularly useful for purifying water in swimming pools and spas, is of the type having pleated, i.e., accordion-like, inner and outer filter elements 11 and 13, respectively. Each element 11, 13 has radially-inwardly-protruding edges 15 and radially-outward roots 17 between such edges 15. Edges 15 and roots 17 of the inner element 11 are shown in FIG. 1. Each of the elements 11, 13 is "wrapped" to have a generally-cylindrical shape and such elements 11, 13 are spaced from one another and are concentric with one another and with a cartridge central axis 19.

As a brief description of operation, water flows radially inwardly through the outer element 13 and radially outwardly through the inner element 11. Flow through both elements 11, 13 converges at the water flow space 21 between them. Because there is significant pressure drop across each element 11 and 13 because such elements 11, 13 are preferably made of lightweight polypropylene mesh which does not withstand such pressure drop, a latticed core 25 is between the elements 11, 13 for element support.

Figure 7:
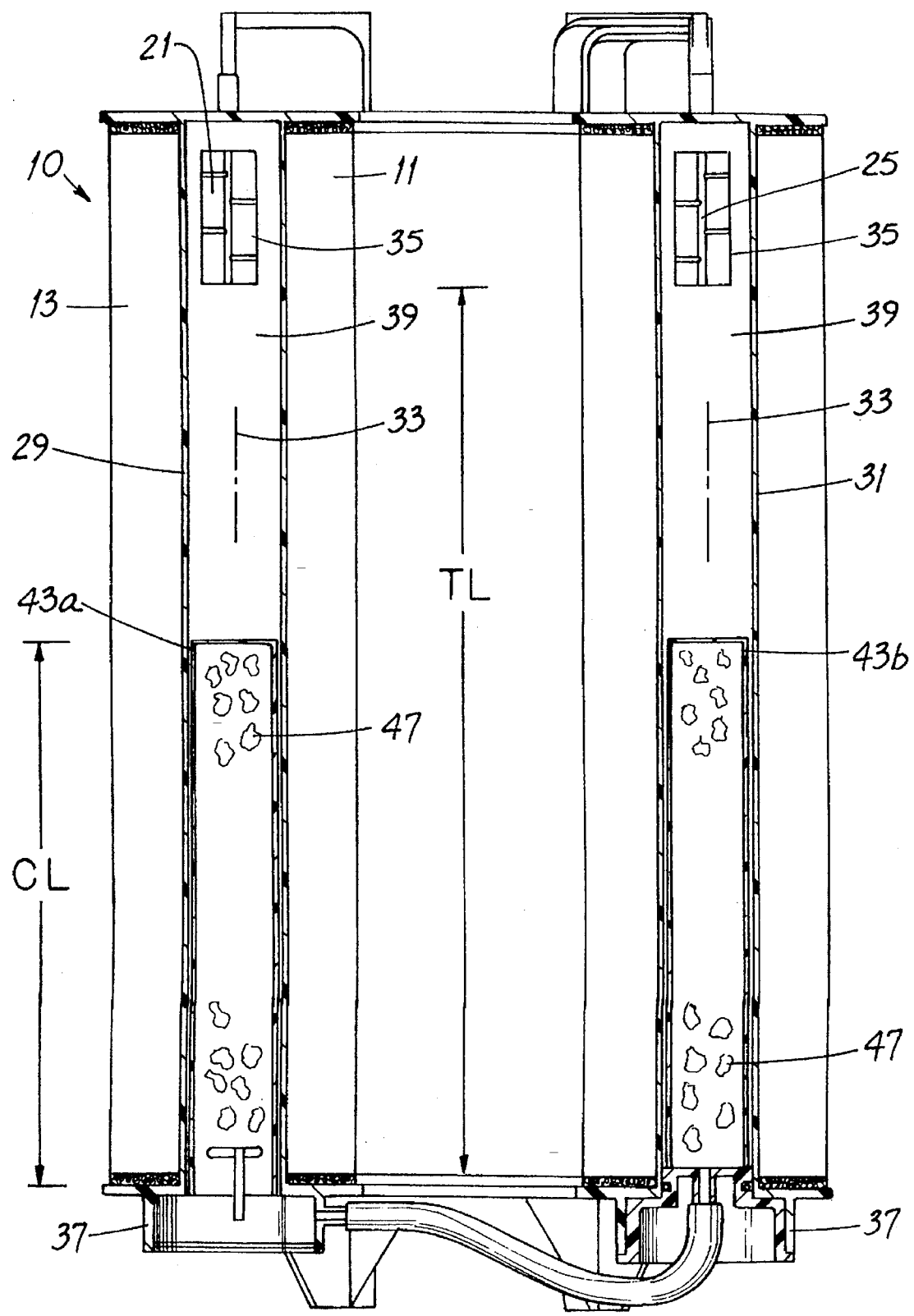
FIG. 7 is a sectional elevation view (generally like that of FIG. 1) of another embodiment of the new filter cartridge.
Figure 8:
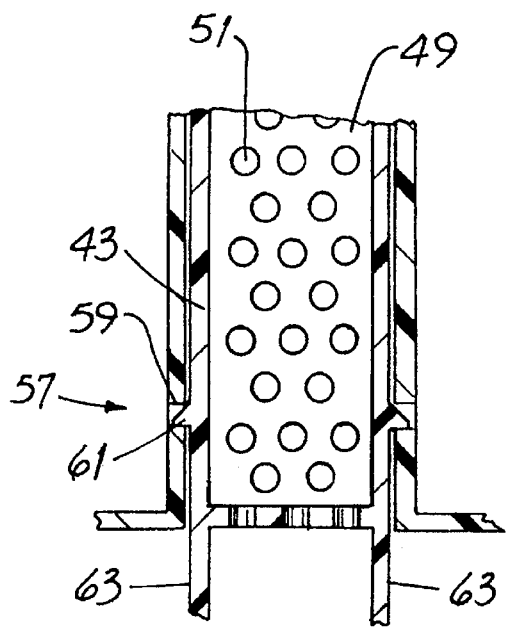
FIG. 8 is a sectional elevation view of one embodiment of a container for holding sanitizing granules or an oxidizer in a cartridge riser tube. Parts are broken away.
Figure 6:
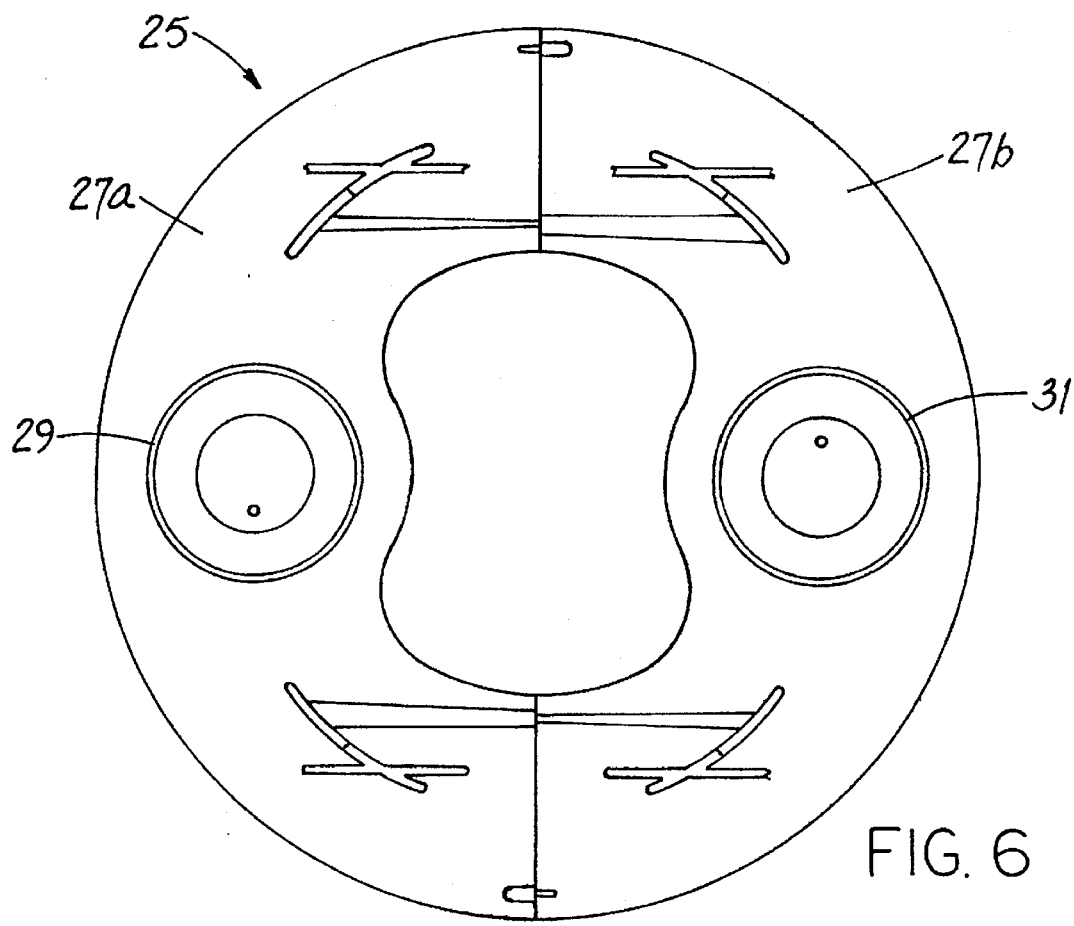
FIG. 6 is a top plan view of a lattice core made using two half-cores as shown in FIG. 2.

In a highly preferred embodiment, the core 25 is made of two identical half-cores 27a, 27b which snap-fit together. As best seen in FIGS. 1, 3, 5, 6 and 7 each half-core 27a, 27b includes an elongate, generally-cylindrical riser tube 29 or 31 extending along the water flow space 21. As shown in FIGS. 1, 6 and 7, such tubes 29, 31 are identified as first and second riser tubes respectively. Each such tube 29, 31 extends along a tube axis 33 which is generally parallel to the cartridge axis 19. Each tube 29, 31 includes an inlet opening 35, an outlet port 37 and a substantially imperforate wall 39 extending between the opening 35 and the port 37.

Referring particularly to FIGS. 1, 7, 8 and 9, there is a container 43a in the water flow space 21 (and, more specifically, in the tube 29 between the inlet opening 35 and the outlet port 31) for holding sanitizing granules 47 in the space 21. Such container 43a includes a latticed, generally-cylindrical support member 49 sized to fit into the tube 29 with slight clearance. The member 49 is perforated, i.e., it has a number of openings 51 therethrough so that as represented by the arrows 53, water can flow into such member 49 and across the catalytic granules 47 comprising the bactericide. Waterborne bacteria contacting the granules 47 are killed upon contacting such granules 47.

In one embodiment, the granules 47 comprise a silver crystal matrix releasing silver ions. Trace amounts of copper are also present as an anti-algae agent.

Figure 9:
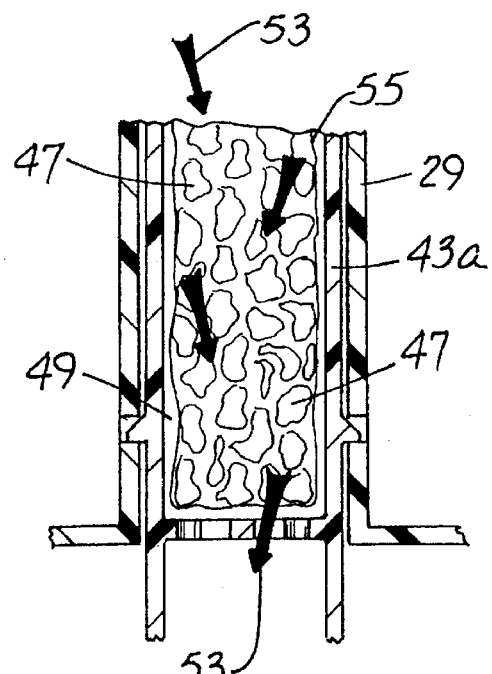
FIG. 9 is a sectional elevation view (generally like that of FIG. 8) of another embodiment of a container for holding sanitizing granules or an oxidizer in a cartridge riser tube. The container is shown to be holding sanitizing granules. Parts are broken away.

In a more specific embodiment shown in FIG. 9, the granule container 43a includes a inner flaccid bag 55 confining the granules 47 in the support member 49 around the bag 55. So configured, a cartridge user may merely replace the bag 55 without replacing the support member 49.

Unless restrained, the support member 49 will be urged out of a tube 29 or 31 by the pressure drop along the tube 29 or 31. To prevent that eventuality, there is a retention device 57, e.g., a notch 59 receiving a tab 61 for positionally securing the support member 49 in the tube 29 or 31. To disengage the tabs 61 from the notches 59, the arms 63 are squeezed toward one another. And, of course, other types of retention devices 57 may be used.

In another embodiment shown in FIG. 7, there is a container 43a, 43b of catalytic granules 47 in each of the first and second riser tubes 29, 31, respectively, thus providing two flow paths for catalytic bacteria killing. And yet another embodiment (shown in FIG. 1) combines the features of both catalytic bacteria killing and bacteria killing by dispersing an oxidizer 65, e.g., chlorine or bromine, in the water. In this instance, the first riser tube 29 holds granules 47 and the second riser tube 31 holds an oxidizer 65, e.g., chlorine or bromine pellets 65a. In either instance, the granules 47 or pellets 65 are positioned between the tube inlet opening 35 and its outlet port 37.

The former arrangement, having two riser tubes 29, 31 holding catalytic granules 47, provides parallel flow paths through such granules 47 and is therefore effective to reduce pressure drop through the granules 47 while yet assuring that some minimum quantity of water comes into contact with such granules 47. And as shown in FIG. 7, pressure drop may be yet further reduced by providing the granules 47 in containers 43a, 43b having a container length CL significantly less than the effective tube length TL. (It is also apparent that pressure drop along a tube 29, 31 may be regulated by providing an adjustable shutter for partially occluding an inlet opening 35. This arrangement is less preferred because consumers likely to use the new cartridge 10 may not properly adjust such a shutter.)

In the arrangement of FIG. 1 involving both sanitizing granules 47 and an oxidizer 65, the cartridge 10 is an integrated water treatment "package" for removing impurities in three different ways. That is, such cartridge 10 includes small-micron filter elements 11, 13 for mechanically removing particulates, sanitizing granules 47 for killing bacteria on contact and an oxidizer 65 which migrates into the flowing water for further bacteria kill.

Referring again to FIG. 1, in the arrangement involving a riser tube 31 holding an oxidizer 65, it is to be appreciated that "oxidizer-rich" water is around and in contact with such oxidizer 65, especially when the water pump is off and water is quiescent in the cartridge 10. A common material for making the filter elements 11, 13 is or includes pleated, thin-strand polypropylene mesh which is known to be attacked by a concentrated oxidizer 65.

In a preferred embodiment, a check valve 69 is interposed between the inlet opening 35 and the oxidizer 65 to prevent the oxidizer-rich water from backflowing or migrating through the inlet opening 35 and attacking the filter elements 11, 13. But for the check valve 69, such migration may occur during quiescent conditions.

And in a highly preferred embodiment, there is a second check valve 71 interposed between the oxidizer 65 and the outlet port 37. In a quiescent system, both check valves 69, 71 are closed, effectively isolating the oxidizer 65 (and the oxidizer-rich water) inside the riser tube 31 and away from the mesh filter elements 11, 13.

Polypropylene, injection-molding-grade, is also used to make the core 25 and its riser tubes 29, 31 and this grade of polypropylene seems more resistant to oxidizers 65. But in any event, such riser tubes 29, 31 are thick-walled and while subject to some "chalking" due to the presence of quiescent oxidizer-rich water therein, they are not likely to be eaten away by such water.

In a specific embodiment involving two riser tubes 29, 31 containing, respectively, sanitizing granules 47 and/or an oxidizer 65, it is preferred that both of the outlet ports 37 of such riser tubes 29, 31 exhaust to and through the cartridge housing via a common discharge port. Accordingly, the cartridge 10 includes a duct 73 in flow communication with the outlet ports 37. Such duct 73 may be embodied as a rigid or flexible pipe plumbed between such outlet ports 37 as shown or, as represented by the dashed line 75, it may be a duct 73 molded as part of the core 25 or other filter element support structure.

As noted above, in operation, water flows radially inwardly through the outer element 13 and radially outwardly through the inner element 11, thus filling the flow space 21. When starting with an empty cartridge 10 and surrounding housing, the water level in the housing and flow space 21 rises at substantially the same rate because of the porosity of the elements 11, 13.

When the water level reaches the inlet opening(s) 35, water flows down the riser tube(s) 29, 31 and out of the outlet port(s) 37. (It should be understood that rather than configure the cartridge 10 to have a single outlet port 37 exhausting to a single discharge port in the housing as described above and in U.S. Pat. No. 5,190,651 (Spencer et al.), the cartridge 10 may have two outlet ports feeding respective discharge ports 37 in the housing. In the latter case, the discharge ports are joined by a manifold in the housing so as to have a single piped water passage at the exterior of such housing.)

However, not all of the water flowing through the cartridge 10 flows through the riser tubes 29, 31 and across the granules 47 or the pellets 65a. A significant portion of the total flow through the cartridge 10 "bypasses" the riser tubes 29, 31 by flowing out of the slot 77 at the bottom of each tube 29, 31.

The new filter cartridge 10 may conveniently be used in a housing of the types shown in U.S. Pat. No. 5,190,651 (Spencer et al.). Such patent is incorporated herein by reference.

While the principles of the invention have been shown and described in connection with specific embodiments, it is to be understood clearly that such embodiments are by way of example and are not limiting.

What is claimed:

1. In a filter cartridge of the type having a central axis, an inner filter element radially outwardly spaced from the central axis and an outer filter element concentric therewith and radially outwardly spaced from the inner filter element, and wherein the filter elements define a water flow space therebetween, the improvement comprising a container of sanitizing granules in the space, such container being radially spaced away from the central axis and out of registry therewith, whereby waterborne bacteria contacting the granules are chemically killed.

2. The cartridge of claim 1 wherein the container includes:

a flaccid bag confining the granules; and a perforated, substantially rigid support member around the bag.

3. The cartridge of claim 2 including a riser tube extending along the water flow space and wherein the support member is in the tube.

4. The cartridge of claim 3 wherein:

the tube is elongate and includes upper and lower ends, an inlet opening adjacent to the upper end, an outlet port adjacent to the lower end and a substantially imperforate wall extending between the opening and the port; and the support member is between the inlet opening and the outlet port.

5. The cartridge of claim 3 wherein:

the filter elements are generally cylindrical and concentric with a cartridge axis; and the riser tube extends along a tube axis generally parallel to the cartridge axis.

6. The cartridge of claim 3 including a retention device positionally securing the support member and the tube to one another.

7. The cartridge of claim 1 including first and second riser tubes in the flow space and wherein:

the container is in the first riser tube; and the second riser tube holds an oxidizer.

8. The cartridge of claim 7 wherein:

oxidizer-rich water is around the oxidizer;

the second riser tube includes an inlet opening; and a check valve is interposed between the oxidizer and the inlet opening, thereby preventing the oxidizer-rich water from backflowing through the inlet opening.

9. The cartridge of claim 8 wherein:

the check valve is a first check valve;

the second riser tube includes an outlet port; and a second check valve is interposed between the oxidizer and the outlet port.

10. The cartridge of claim 7 wherein:

the container is a first container;

the second riser tube includes an inlet opening, an outlet port and a substantially imperforate wall extending between the opening and the port; and the oxidizer is in a second container between the inlet opening and the outlet port.

11. The cartridge of claim 7 wherein:

the first and second riser tubes include first and second outlet ports, respectively; and a duct is in flow communication with the outlet ports.

12. The cartridge of claim 1 wherein:

the container is a first container; and the cartridge includes a second container of sanitizing granules in the space.

13. The cartridge of claim 12 including first and second riser tubes in the flow space and wherein:

the first container is in the first riser tube; and the second container is in the second riser tube.

14. The cartridge of claim 13 wherein:

each of the riser tubes extends along a tube length;

each of the containers has a container length significantly less than the tube length.

* * * * *